350-166. SR 11-30-71 XR 3,624,272

[11] 3,624,272

[72] Inventor Michel Favreau
Paris, France
[21] Appl. No. 9,576
[22] Filed Feb. 9, 1970
[45] Patented Nov. 30, 1971
[73] Assignee Thomson-CSF
Paris, France
[32] Priority Feb. 27, 1969
[33] France
[31] 05192

[54] TRICHROMATIC OPTICAL SEPARATOR SYSTEM USING CONCAVE DICHROIC MIRRORS
5 Claims, 3 Drawing Figs.

[52] U.S. Cl. .......... 178/5.4 E, 178/7.86, 350/166, 350/169
[51] Int. Cl. .......... G02b 27/10
[50] Field of Search .......... 350/290, 27, 171, 164, 166, 169; 178/5.4 E, 7.86

[56] References Cited
UNITED STATES PATENTS 2,703,506 3/1955 Kelly .......... 350/169
3,293,357 12/1966 Doi et al. .......... 178/5.40
2,792,740 5/1957 Haynes .......... 178/5.40

*Primary Examiner*—Benedict V. Safourek
*Assistant Examiner*—Donald E. Stout
*Attorney*—Flynn & Frishauf

ABSTRACT: To prevent distortion during chromatic separation of images being scanned, for example by a flying spot scanner or the like, and for detection by photomultipliers associated, respectively, with red, green, and blue color components, the trichromatic separator system includes two, concave dichroic mirrors and located beyond a condenser lens which gives a real image of the output diaphragm of the objective lens, and a third, totally reflecting concave mirror, or a lens. The optical axes of the concave dichroic mirrors are inclined with respect to the optical axis of the condenser lens, and project a real image of the output diaphragm on the photosensitive surface of the photomultipliers to provide color video signals corresponding to the point being analyzed for brightness and color content. Preferably, the curvature of the mirrors is so chosen that the enlargement is in the neighborhood of unity so that the beams of light from the output diaphragm of the equipment generating the scanning light beams, falling on the mirrors, have a substantially constant angle of incidence.

TRICHROMATIC OPTICAL SEPARATOR SYSTEM USING CONCAVE DICHROIC MIRRORS

The present invention relates to trichromatic optical separating systems, and more particularly to such systems which utilize dichroic mirrors which separate beams of light into the color contents contained within the beam. Such equipment is utilized, for example, in color television, to scan color films, to analyze fixed color images, and the like.

It has previously been proposed to separate beams of light into three basic color components by separating the beam into three distinct monochrome beams. In color television pickup tubes the separators are located between the objective lens and the tubes analyzing the monochrome components of the image. In film, or slide or image analyzer systems, utilizing flying spot scanners, a cathode ray tube provides a high-intensity sharply focused scanning light spot, scanning across the film frames in accordance with a selected television standard. An optical objective focuses the luminous spot on the film, or transparency to be analyzed. The light is collected by an optical condenser, modulated by the variable transparency of the image to be analyzed, and this optical condenser gives a real image of the output diaphragm of the objective lens from which the light is derived, on the sensitive surface of a photomultiplier which provided the electrical video signal. Problems arise due to nonuniformity of the sensitive surfaces of the photomultiplier. In color reproduction additional problems arise since a trichromatic separator must be located between the condenser and the light-electrical signal transducer in such a manner that the bundle of modulated light is separated into three monochromic beams which excite three photomultiplier tubes, each delivering the respective video signals corresponding to the three monochrome light values of the image point being analyzed.

The trichromatic separators usually are flat dichroic mirrors. These mirrors act like filters which reflect the light component incident thereto within a certain spectral band, while transmitting other components. The response curve of light transmission versus wavelength is similar to a band pass filter. It is thus possible to select the three color components red, green, and blue of incident light.

Dichroic mirror arrangements of various types have been proposed. They do, however, result in difficulties due to the geometry of the system, and the property of the dichroic mirrors that the spectral response curve and the reflection coefficients vary with the angle of incidence of the beams of light falling on the mirror. The video output signal delivered by the photomultiplier thus is subjected to parasitic frequency and amplitude modulations due to the nonlinearity of the mirrors themselves. Known systems are arranged such that the light falling on the dichroic mirrors is as parallel as possible and as close to the optical axis of the system as possible to eliminate these spurious effects; this requires, however, a high-intensity light and as the lens openings used in the system increase, it is difficult to maintain this parallelism.

It is an object of the present invention to provide a simple trichromatic color separation system, particularly useful for color television apparatus utilizing a flying spot scanner, in which spurious frequency and amplitude variations of the video signal are eliminated, or at least reduced to a negligible value not affecting the quality of the output signal for subsequent reproduction.

SUBJECT MATTER OF THE PRESENT INVENTION

Briefly, the trichromatic separator system is formed by at least two, and preferably three concave dichroic mirrors, each selecting a monochrome component of a light beam which has passed through, or has been reflected from an image to be analyzed. The dichroic mirrors are located beyond the projected real image of the output diaphragm of the objective lens supplied by a condenser lens within the system; the optical axes of the concave dichroic mirrors are inclined with respect to the axis of the condenser lens, so that a further real image of the output diaphragm will be formed at, or close to the photosensitive surface of photomultiplier tubes (or similar light-electrical signal transducers), which then will provide color video output signals corresponding to the color content and brightness of the point being analyzed. The curvature of the dichroic mirrors is preferably so chosen that the enlargement factor is in the neighborhood of unity, the different light beams derived from the output diaphragm being applied to the mirrors with a substantially constant angle of incidence.

Only two mirrors are necessary, but a third curved mirror is preferred, which may be an ordinary reflector without dichroic properties, the third mirror forming a real image of the output diaphragm on the surface of a photomultiplier of all the remaining light components not separated out by the other two dichroic mirrors.

The invention will be described by way of example with reference to the accompanying drawings, wherein.

Figure 3:
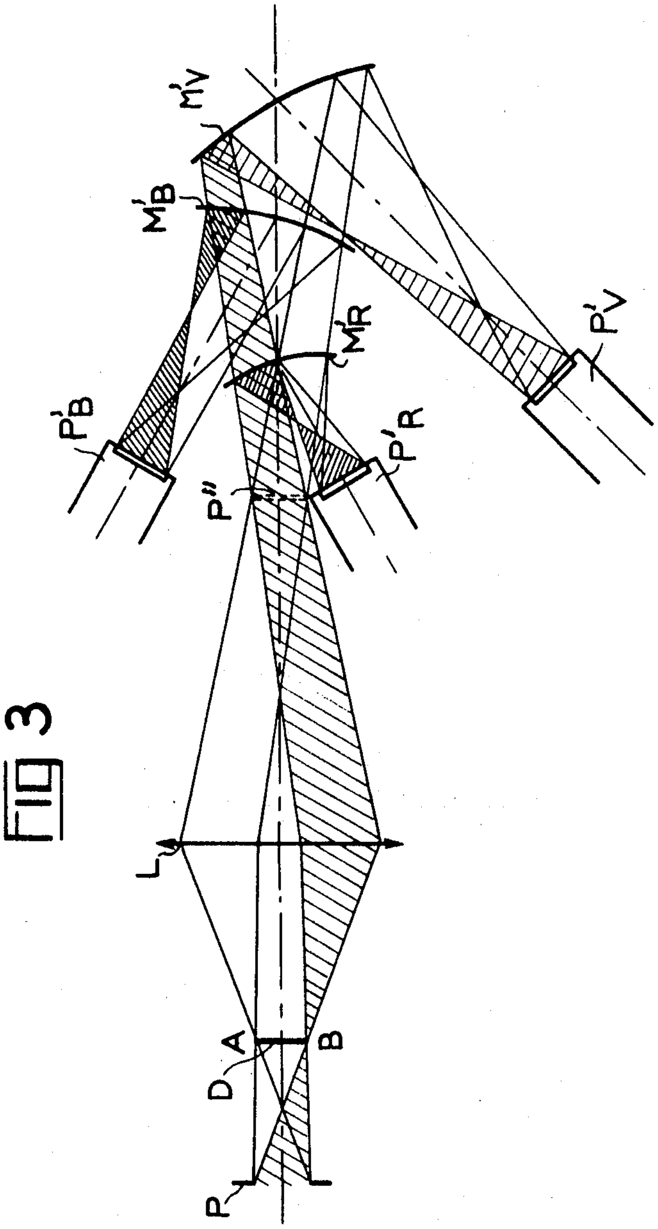

and FIG. 3 is a simplified diagram of the tricolor separating system in accordance with the present invention, and illustrating the paths of light beams.

Figure 1:
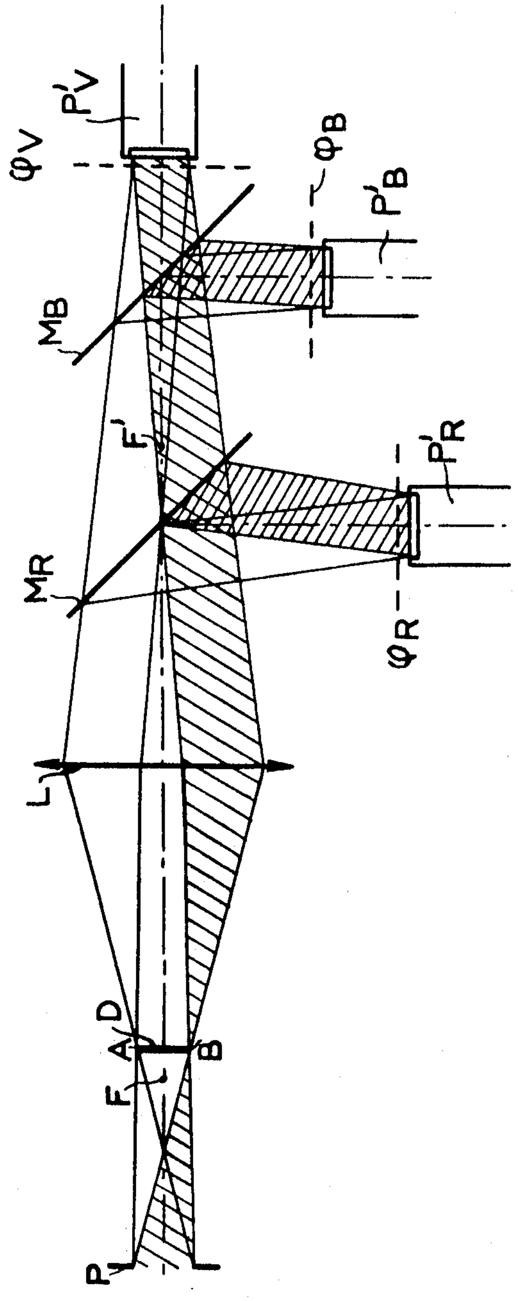
FIG. 1 is a simplified schematic diagram illustrating a prior art system of trichromatic color separation.

The prior arts will first be explained so that the difference, and the improvement resulting from the practice of the present invention will be clear. FIG. 1 illustrates a color separating system, for example for a telecine system, or for a color analyzer of fixed images, in which a cathode ray tube of the flying spot scanner type, not shown, scans a field which is, as known, passed through an objective lens, the output diaphragm of which is illustrated schematically as P.

As the cathode ray flying spot scanner tube scans, in accordance with selected standards, the beam traversing diaphragm P is focused by the objective lens at the image, or transparency to be analyzed and shown at D. The extremes of the positions of the scanned beam will be between points A and B of FIG. 1. A converging lens L, having focal points F, F′ respectively is located in the path of light, now modulated by the varying color and transparency of the scanned image D, and directs the light to the color separating system. An image of diaphragm P is formed in the plane of the photomultipliers $P'_R$, $P'_B$ and $P'_V$, preferably as a wide beam in order to avoid difficulties arising from nonuniformity of the photosensitive surfaces.

The color separation system as illustrated in FIG. 1, itself, includes a first dichroic plane mirror $M_R$, inclined for example by an angle of 45° with respect to the optical axis of lens L, and in the path of the entire beam of light. This dichroic mirror reflects the red component in the direction of photomultiplier $P'_R$. The filter effect due to the mirror $M_R$ may be improved by inserting an additional transmission filter $\Phi_R$. In similar manner, a dichroic mirror $M_B$ is located in the path of the light beam passing through the mirror $M_R$, and reflecting in the direction of photomultiplier $P'_B$ the blue component of the light beam. A blue filter $\Phi_B$ may be used. The green, and remaining components of the luminous beam and having passed both mirrors $M_R$ and $M_B$ are applied to a photomultiplier $P'_V$; a green filter $\Phi_V$ may be interposed.

At any instant of time, the photosensitive surface of the photomultipliers $P'_R$, $P'_B$, and $P'_V$ is excited by the luminous flux transmitted by the diaphragm P, modulated by the image D, and condensed by lens L. The photomultipliers thus deliver an electrical signal which will be a function of the brightness of light applied to their sensitized surface, thus providing a video output signal characteristic of the monochrome components of the image being scanned.

The outside limits of the light beams of the bundle of light corresponding to analysis of points A and B are shown in FIG. 1, the bundle of light corresponding to B being crosshatched on the drawing.

The system of FIG. 1 gives rise to difficulties, particularly due to the variation of spectral response of the filters and the coefficient of reflection, with respect to the angle of incidence of the light beams on the mirrors themselves. This is clearly evident from FIG. 1.

An additional difficulty arises from the finite size of the opening of diaphragm P. The luminous beam received from the lens P, which is applied to the point B of the image D, for example, becomes divergent after having traversed the converging lens L. Thus, the angle of incidence of the beam to the mirrors $M_R$ and $M_B$ is nonuniform. A certain loss of spectral selectivity will result, which will be reflected in the output from the photomultipliers $P'_R$ and $P'_B$, which supply the corresponding red and blue video signals.

Distortion may also result from the angle of incidence of the beam of light on the mirrors $M_R$ and $M_B$ , varying with the point of the image D which is being analyzed. The video signals delivered by the photomultipliers $P'_R$ and $P'_B$ thus will have parasitic amplitude and frequency modulation due to the nonuniform reflection characteristics of the mirrors.

Figure 2:
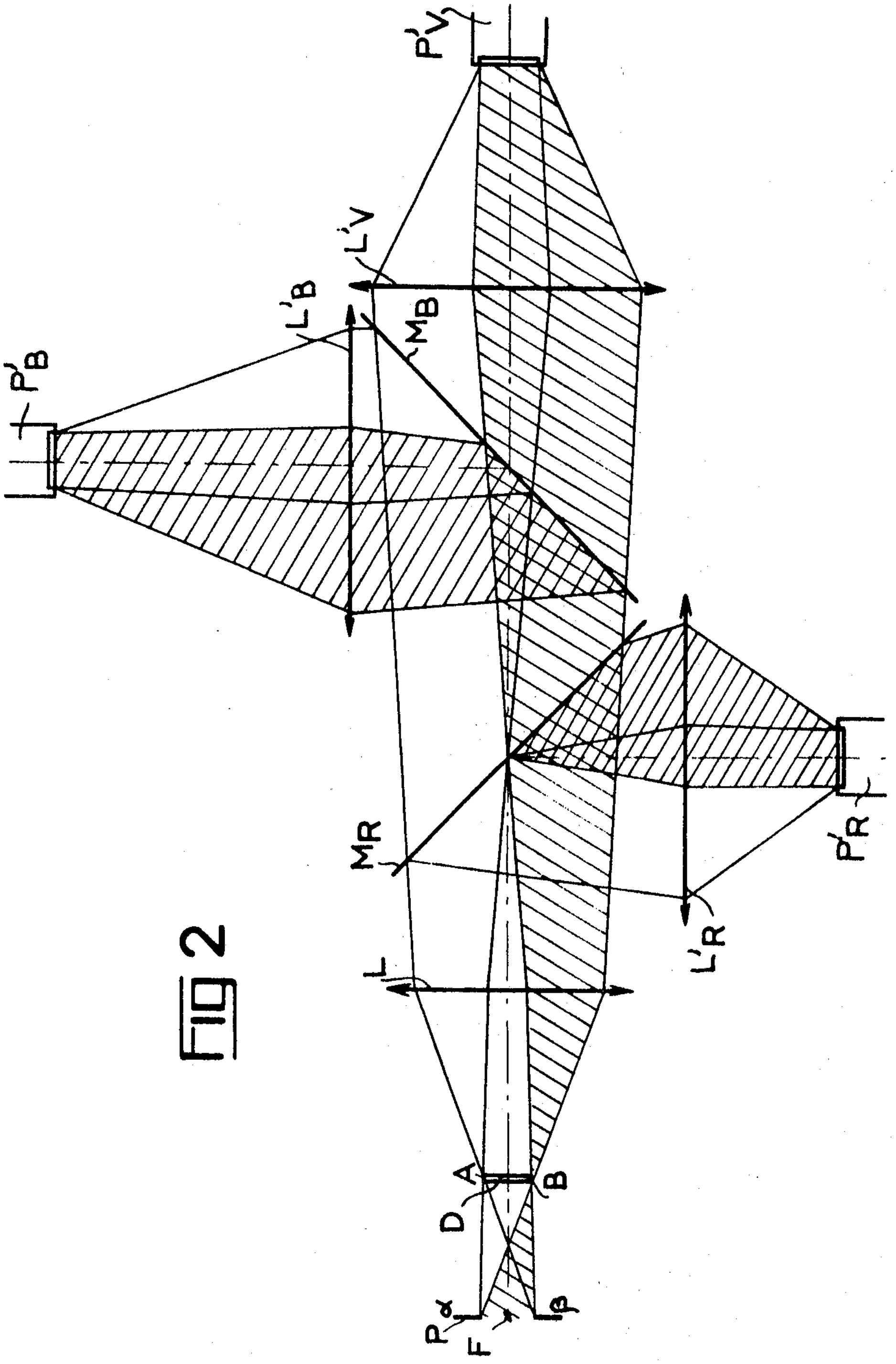
FIG. 2 is a simplified schematic diagram of a more complex prior art color separation system.

The linearity of the video signal with respect to the light is improved by the system of FIG. 2. Diaphragm P is located in the focal plane F of the converging lens L. The output luminous beam from lens L is split into the components by the dichroic mirrors $M_R$, $M_B$, and three essentially monochrome beams are applied, respectively, to photomultiplier tubes $P'_R$, $P'_B$ and $P'_V$. Three intermediate converging supplementary lenses $L'_R$, $L'_B$, and $L'_V$ are interposed in the beams of light. As appears from the crosshatched regions in FIG. 2, the beams are divergent and the supplementary lenses are necessary so that the real image of the output diaphragm P will be applied to the sensitive surface of the photomultipliers $P'_R$, $P'_B$ and $P'_V$.

The arrangement of FIG. 2 provides for quasi-suppresion of spurious frequency and amplitude modulations, since the beams coming from one and the same point of diaphragm P, and falling at different points on the image D to be analyzed, are parallel after traversing lens L and, therefore, have a substantially uniform angle of incidence on the dichroic mirrors.

The improvement is obtained, however, at a loss of spectral selectivity, due to the aperture of diaphragm P, the light beam from which is divergent after traversing lens L, as seen by the crosshatched region of the light beam. Still, the variation of the angle of incidence is in the neighborhood of ±10°.

An additional disadvantage of this arrangement is the comparatively large space requirements and the high price, increased by the necessity for three supplementary lenses, and relatively large mirrors which are necessary so that all of the light beam from lens L can be intercepted.

The present invention is illustrated in FIG. 3 and is principally characterized by utilizing a trichromatic separator in which the mirrors are curved and the entire arrangement is placed with respect to the output diaphragm P of the scanner lens system (not shown) beyond the focal length F of the converging lens L, so that a real image P'' will be formed.

The beam of light from diaphragm P traverses the image plane D and then through lens L. It is divergent after formation of the real image P'' of the lens. The trichromatic separators, in accordance with the invention, are interposed in the path of the divergent beam; they include two dichroic, concave mirrors $M'_R$ and $M'_B$; a third, concave and totally reflecting, ordinary mirror $M'_V$ reflects the remaining light passed by the other two mirrors.

The concave mirrors have a plural function. On the one hand, they reflect the light beam and provide a converging beam forming again a real image of diaphragm P on the sensing surface of the photomultipliers $P'_R$, $P'_B$ and $P'_V$. This arrangement is an improvement over that of the system shown in FIGS. 1 and 2, particularly FIG. 2, since the space requirements are considerably reduced and the optical separating arrangement is simplified. The third concave mirror $M'_V$ forms a real image of the diaphragm P in the plane of the photomultiplier $P'_V$; it may be replaced by a converging lens which, however, will have much smaller dimensions than those of the corresponding lens of the system illustrated in FIG. 2. The additional function of the concave dichroic mirrors $M'_R$ and $M'_B$ is to provide compensation by means of the inclination of the mirrors with respect to the axis of the optical system formed by the lens L. The apex of the mirrors is located on the optical axis of the lens L, but the optical axes of the mirrors are inclined with respect to the axis of lens L. The radius of curvature of the mirrors is so selected that the enlargement obtained on the sensitized surfaces of the photomultipliers, with respect to the real image P'' is close to, or slightly greater than one. With such an arrangement, compensation of distortion due to the variable inclination of the light beam about the optical axis of lens L, resulting in variable angles of incidence on the mirror surfaces, is provided.

The separating system as illustrated in FIG. 3 eliminates parasitic modulations of the video signal obtained from the photomultipliers, without, however, reducing the spectral selectivity. The variations in the angles of incidence on the dichroic mirrors of light beams coming from different points of diaphragm P, for any one point on the image plane D, as well as the light beams coming from the same point of the diaphragm P and passing different points of the image plane D, are considerably reduced. This limits on the one hand the loss of the spectral selectivity while simultaneously reducing parasitic modulations to a practically negligible amount. In actual practice, the angular variation is only a few degrees in either direction about an average angle of incidence of 30°, for example. Due to the decrease of the angular variation, and the average small angle of incidence of the system of the present invention, variations in the reflection coefficients of the dichroic mirrors with respect to the same wavelength are reduced, in proportion to the decrease of the angle of incidence. The system of the present invention thus provides a trichromatic separator of excellent quality, of small size, and of constructional simplicity so that it can be built at a low price. It is particularly applicable for color telecine systems, or for analyzers of fixed images which utilize flying spot scanning cathode ray tubes. In such equipment the spot, or smear effect due to parasitic modulations of the color components of the video signals are undesirable and annoying to the viewer, which smear is usually due to the chromatic separating system. The system in accordance with the present invention avoids such smear effect. The chromatic separating system can likewise be used for certain motion picture color pick up systems, such as reproducing systems for technicolor film.

Various changes and modifications may be made within the scope of the inventive concept.

I claim:

1. In an apparatus for scanning an image-bearing medium by means of a convergent light beam directed towards said medium through an output diaphragm, a trichromatic separating system for the divergent colored light beam issuing from said medium, said system comprising:

a converging condenser lens (L);

a pair of concave, dichroic mirrors ($M'_R$, $M'_B$), each selecting a monochrome component (R, B) of the light beam issuing from said medium;

said concave dichroic mirrors being located beyond the real image (P'') of said output diaphragm (P) as projected by said condenser lens (L);

the optical axes of said dichroic mirrors being inclined with respect to the axis of said condenser lens; and photoelectric transducer means ($P'_R$, $P'_B$) providing electrical output signals in accordance with light being applied to a sensitive surface thereof, said dichroic mirrors forming real images of said image (P'') of said output diaphragm (P) at, or close to, the plane of said sensitive surface.

2. System according to claim 1 in which the angle of inclination of the optical axes of the dichroic mirrors ($M'_R$, $M'_B$) with respect to the optical axis of said condenser, and the radius of curvature of said concave dichroic mirrors are selected to provide an enlargement in the order of unity, the light beam from said output diaphragm (P) impinging the mirrors with a substantially uniform angle of incidence.

3. System according to claim 1 including a third photoelectrical transducer means $P'_V$ to provide an electrical output corresponding to a third spectral band of said light beam;

and means converging the remainder of said beam of light, after having passed through said concave dichroic mirrors on said third photoelectric transducer means.

4. System according to claim 3 wherein said means focusing the remainder of said light beam includes a lens ($L'_V$- FIG. 2).

5. System according to claim 3 wherein said means focusing the remainder of said beam having passed said successive concave dichroic mirrors includes a totally reflecting concave mirror ($M'_V$), said concave ordinary mirror forming a real image of said output diaphragm P at, or close to the plane of the photosensitive surface of said photoelectric transducer means ($P'_V$).

* * * * *